3,578,588
POLYHYDROXYL COAGULANT COMPOUNDS
Andrew G. Tsuk, Laurel, Md., assignor to W. R. Grace & Co., New York, N.Y.
No Drawing. Filed July 22, 1969, Ser. No. 843,814
Int. Cl. B01d 21/01
U.S. Cl. 210—52
12 Claims

ABSTRACT OF THE DISCLOSURE

Compositions of polyhydroxyl compounds of the polygalactomannans such as guar gum or locust bean gum with borax are good flocculants for cellulosic substances. These compositions readily flocculate cellulose suspensions having a pH of 7 or more. The gums comprise cationically modified gums as well as the unmodified gums.

BACKGROUND OF THE INVENTION

This invention relates to a composition and a method of using this composition in flocculating cellulose suspensions. The composition consists of a complex of polygalactomannan gums with borax. The complex on addition to a cellulosic suspension or slurry of pH 7 or more flocculates the cellulose clarifying the solution.

This invention concerns complexes of cationically modified and unmodified polygalactomannan gums with borax. The polygalactomannans are polysaccharides composed principally of galactose and mannose units and are usually found in the endosperm of leguminous seeds, such as guar, locust bean, honey locust, flame tree, and the like. Guar flour for example, is composed mostly of a galactomannan which is essentially a straight chain mannan with single membered galactose branches. The mannose units are linked in a 1,4-β-glycosidic linkage and the galactose branching takes place by means of a 1,6 linkage on alternate mannose units. The ratio of galactose to mannose in the guar polymer is, therefore, one to two. Locust bean gum is also a polygalactomannan gum of similar molecular structure in which the ratio of galactose to mannose is one to four. Guar and locust bean gum are the preferred sources of the polygalactomannans principally because of their commercial availability.

Cellulosic suspensions are a problem to the paper and related chemical process industries. Waste waters from these processes contain up to 1000 parts per million of cellulose. These waters must be cleaned before entering a public waterway. The present invention offers an efficient and inexpensive method of removing this cellulose.

Polyhydroxyl compounds such as the polygalactomannans are strongly hydrophilic, yet, as a rule, they do not dissolve easily in water. The reason for this is that the hydroxyl groups can hydrogen-bond to each other. If spatial arrangements allow simultaneous bonds by several pairs of hydroxyls on the same substance, the result is an insoluble gel. This explains the insolubility of cellulose, amylose, chitin, and the easy gelation of polyvinyl alcohol. However, if this pairing is obstructed by intruding bulky groups, the water solubility is greatly increased. Examples of this are cellulose ethers and esters and amylopectin (which is highly branched).

The polygalactomannans such as guar gum, locust bean gum or the cationically modified guar and locust bean gums are well known deflocculating agents. On the addition of water to the powdered gum a highly viscous solution is formed. This solution in the viscous state readily suspends solid particles and maintains them in this state. To use these gums in the form of a complex to flocculate a suspension is generally new to the art. It is not usually expected that a good deflocculant may readily be converted to a very effective flocculant. Such is the case, however, in the flocculation of cellulosic suspensions using the gum-borax complexes of the present invention.

The most pertinent prior art is set out in U.S. Pats. 2,644,762 and 3,342,732. In U.S. 2,644,762, a composition of locust bean gum, borax and an aldehyde is disclosed. This composition is readily soluble in water and is used to deflocculate fibers suspended in an aqueous media. U.S. 3,342,732 discloses the use of polysaccharide gumaluminum sulfate complexes for flocculating kaolin clays. In the present invention a polygalactomannan-borax complex is used to flocculate cellulosic suspensions. This is in contrast to deflocculating, a suspension or the use of an aluminum sulfate complex to flocculate. This invention gives the advantage of making cellulose suspensions more rapidly and separable using low dosages of flocculant. Filtrations, centrifugations, etc., can then be more readily performed.

It is an object of this invention to disclose a composition for flocculating cellulosic suspensions. It is also an object of this invention to set out a method of flocculating suspended cellulose.

It is further an object of this invention to set out a method of making a cellulose suspension more readily filterable.

SUMMARY OF THE INVENTION

Broadly, the present invention comprises a method of coagulating or flocculating cellulose suspensions in process or waste waters. Polygalactomannan gum-borax complexes in solution are absorbed by cellulose suspensions causing flocculation. This flocculation is carried out at a pH of above about 7 in an aqueous solution containing as to per million parts water, about .5 to 20 parts gum or more and about 30 to 500 parts borax or more to about 50 to 1000 parts or more of suspended cellulose.

The flocculated cellulose is removed from solution by settling, filtration or other common process technique.

DETAILED DESCRIPTION OF THE INVENTION

Polygalactomannan gums possess vicinal cis diol groups which form strong complexes with borates such as

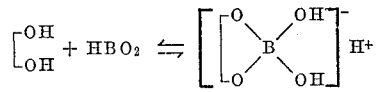

or

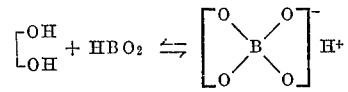

These complexes are stronger acids than the parent boric acid, so higher pH values shift the equilibria to the right. If the diol is polymeric, this reaction represents a crosslink. Polymers that are crosslinked, and therefore precipitated, by borate, include quar and locust bean gums. These gums have a backbone of poly-β-mannoside and numerous pendant galactose moieties. There are vicinal cis diols on both the backbone and the pendant groups. However, there are no such diol groups on polyglucosides, so borates do not crosslink and therefore precipitate starch or cellulose or any of their derivatives. Cellulose is a poly-β-glucoside which is hydrated but not dissolved by water, and which usually forms negatively charged aqueous slurries. Cellulose will however, strongly absorb the polygalactomannans guar gum and locust bean gum and cationically modified guar and locust bean gums. These gums are absorbed strongly because their β-glycosidic structure can match the cellulose configuration. Cellulose is characterized by having trans diol groups in contrast to the cis diol groups of the polygalactomannan gums.

Therefore, since guar and locust bean gums can be strongly absorbed by cellulose, and these gums can be precipitated with borax; when these gums are mixed with cellulose and borax they are absorbed by the cellulose and precipitated by the borax, dragging down the cellulose on which they are absorbed when they are precipitated. The cationically modified guar and locust bean gums with borax are generally more effective in flocculating cellulose than the unmodified gums.

The unmodified gums of the present invention are naturally occuring substances and are extracted by any of a number of known techniques from the guar seed and locust bean. The cationically modified guar and locust bean gums consist of the basic gum backbone structure but with a position of the hydroxyl groups substituted with aminoethyl or diethylaminoethyl cationic groups. An ether oxygen forms a bridge connecting the gum and the cationic group. These aminoethylether modified gums are produced by reacting the gum as a flour with ethyleneimine. The mixture is stirred for about 5 hours and the temperature maintained at between about 25° C. to about 50° C. Unreacted ethyleneimine is then evaporated. The ratio of the ethyleneimine reactant to the gum may vary from .01 equivalent to 1 equivalent. Diethylaminoethyl groups are put on the gums by the reaction of β-diethylaminoethyl chloride with the gum. This yields a diethylaminoethyl ether group connected to the gum by the ether oxygen bridge.

The borax of the composition is added as meta-boric acid or a compound which will yield meta-boric acid on hydrolysis such as the alkali or alkaline earth borates or ortho-boric acid. Of particular importance are the meta- and tetraborates of the alkali and alkaline earth elements. The borax is added so as to preferably be in a stoichiometric excess.

The suspension can contain cellulose from 10 p.p.m. to 1000 p.p.m. and above. The flocculant can be added either as a composition of the gum, modified or unmodified, and borax, or the components added independently in any order. Neither the gum nor borax alone will flocculate the cellulose suspension. The gum alone will be absorbed by the cellulose but there will be no flocculation. Borax will not complex with or precipitate the cellulose. Flocculation will occur shortly after the cellulose suspension contains both the gum and borax or borax yielding compound and the pH has been adjusted to above 7. At a pH of 7, flocculation will occur but slowly. As the pH is raised to about 8.5 the rate increases but with no further increase as the pH is raised past about 8.5. The pH can be adjusted by the use of alkali hydroxides, e.g., sodium hydroxides to raise the pH, or boric acid to lower the pH.

The gum is preferably added to be in a concentration of from about .5 part to about 20 parts for a cellulose concentration of about 50 to 1000 parts per million parts of water. The borax is added so as to be in a concentration from about 30 parts to about 500 parts at these concentrations. High concentrations of the gum and borax will increase the flocculation rate while lesser concentrations will generally not be effective. However, as the parts per million of cellulose increases, it is necessary to add a corresponding amount of gum and borax.

The flocculation is not temperature sensitive and this need not be considered a factor.

Upon completion of flocculation, the settled cellulose can be removed by filtration, or a decantation of the water or both. Prior to decantation, the cellulose may be further settled by centrifugation.

Table I sets out a series of flocculations with various cellulosic substances. It is noted that when the gum or the borax are added alone there is no change in suspended particle size from the untreated blank. The solution must contain both the gum and the borax to flocculate the cellulose. Also of note is that the cationic guar gum is about 5–10 times more effective than the unmodified guar gum or locust beam gum. In a comparison but ⅕ the dosage of cationic guar gum is necessary for flocculation. The floc size and flocculation rate is followed using a photographic technique.

TABLE I

| Cellulose type | Parts cellulose per million parts | Borax, p.p.m. | Guar gum, p.p.m. | Cationic guar gum, p.p.m. | Locust bean gum, p.p.m. | Floc size in relation to untreated blank |
|---|---|---|---|---|---|---|
| Chopped filter paper | 60 | 100 | 10 | | | Slightly larger. |
| Do | 60 | 100 | | 10 | | Very much larger. |
| Do | 60 | 100 | | | 10 | Do. |
| Softwood flour | 300 | 100 | | | | Unchanged. |
| Do | 300 | | 20 | | | Do. |
| Do | 300 | 100 | 20 | | | Much larger. |
| Do | 300 | 100 | | 2 | | Do. |
| Do | 300 | 100 | | | 20 | Do. |
| Do | 300 | 50 | | 10 | | Larger. |
| Do | 300 | 50 | 10 | | | Slightly larger. |
| Bleached spruce pulp | 300 | 100 | | 10 | | Larger. |
| Semi-bleached cedar kraft pulp | 300 | 100 | | 10 | | Do. |
| Unbleached spruce pulp | 300 | 100 | | 10 | | Do. |
| Cotton linters | 300 | 100 | | 2 | | Do. |
| Board mill waste | 474 | 122 | 10 | | | Do. |
| Do | 474 | 44 | | 2 | | Do. |

NOTE.—All pH values were adjusted to 8 or above.

The following examples are set out to further amplify the invention.

EXAMPLE 1

A cellulose suspension is formed from 0.03 g. of particulate Whatman filter paper (disintegrated in a Waring Blendor) and 500 ml. of water to give a 60 p.p.m. suspension. The pH of the suspension is adjusted to 8. To this solution, 10 p.p.m. of guar gum is added. 100 p.p.m. of borax ($Na_2B_4O_7 \cdot 10H_2O$) is further added and the suspension agitated by stirring. Flocs formed and within 10 minutes there is a clear liquid solution and a flocculant precipitate. The precipitate is removed by filtration.

EXAMPLE 2

A 300 p.p.m. cellulose suspension is formed from 0.15 g. of particulate wood flour in 500 ml. of water. The pH of the suspension is adjusted to 8.5. To this solution, a mixture of 20 p.p.m. of guar gum and 100 p.p.m. of borax ($Na_2B_4O_7 \cdot 10H_2O$) is added and the suspension is agitated by stirring. Flocs from and within 5 minutes there is a clear liquid suspension and a flocculant precipitate. The liquid layer is removed by decantation.

EXAMPLE 3

A 300 p.p.m. cellulose suspension is formed from 0.15 g. of particulate bleached spruce pulp in 500 ml. of water. The pH of the suspension is adjusted to 8.1. To this suspension, 10 p.p.m. of cationic guar gum is added. 100 p.p.m. of borax ($Na_2B_4O_7 \cdot 10H_2O$) are further added and the suspension is agitated by stirring. Flocs form and within 5 minutes there is a clear liquid solution and a flocculant precipitate. The cellulose precipitate is removed by filtration.

EXAMPLE 4

A 300 p.p.m. cellulose suspension is formed from 0.15 g. of particulate unbleached spruce pulp in 500 ml. of water. The pH of the suspension is adjusted to 8.5. To this suspension, 100 p.p.m. of borax ($Na_2B_4O_7 \cdot 10H_2O$) is added 20 p.p.m. of locust bean gum is further added and the suspension agitated by stirring. Flocs form and within 10 minutes there is a clear liquid solution and a flocculant precipitate.

EXAMPLE 5

A 30 p.p.m. cellulose suspension is formed from 0.15 g. of particulate semi-bleached cedar kraft pulp in 500 ml. of water. The pH of the suspension is adjusted to 8.7. To this suspension, 20 p.p.m. of locust bean gum is added. 100 p.p.m. of borax ($Na_2B_4O_7 \cdot 10H_2O$) are further added and the suspension agitated by stirring. Flocs form and within 10 minutes, there is a clear liquid solution and a flocculant precipitate.

EXAMPLE 6

A 300 p.p.m. cellulose suspension is formed from 0.15 g. of particulate cotton linters in 500 ml. of water. The pH of the suspension is adjusted to 8.5. To this suspension 10 p.p.m. of cationic guar gum is added. 100 p.p.m. of borax ($Na_2B_4O_7 \cdot 10H_2O$) are further added and the suspension agitated by stirring. Flocs form and within 10 minutes there is a clear liquid solution and a flocculant precipitate.

I claim:
1. The method of removing cellulose from an aqueous cellulose suspension by flocculation comprising:
   (1) adjusting the pH of the cellulose suspension to greater than 7;
   (2) adding a borate and a polygalactomannan gum to said cellulose suspension, said borate being in a substantial excess over said polygalactomannan gum; and
   (3) separating the settled cellulose flocs from the resulting aqueous solution.
2. The method of claim 1 wherein said polyaglactomannan gum is selected from the group consisting of guar gum and locust bean gum and cationic guar gum and cationic locust bean gum.
3. The method of claim 2 wherein said polygalactomannan gum is cationic guar gum.
4. The method of claim 1 wherein said borate is selected from the group consisting of meta-boric acid and ortho-boric acid and sodium meta-borate and sodium tetraborate and potassium meta-borate and potassium tetraborate.
5. The method of claim 1 wherein said borate and said poly-galactomannan are added as a mixture.
6. The method of claim 1 wherein said borate is added and then said polygalactomannan gum is added.
7. The method of claim 1 wherein said polygalactomannan gum is added and then said borate is added.
8. The method of claim 1 wherein said pH is from about 7 to about 11.
9. The method of claim 7 wherein said pH is from about 8 to about 8.5.
10. The method of claim 1 wherein said suspension comprises about 1 million parts water, about 50 parts to about 1000 parts cellulose, about 30 parts to about 500 parts borate, and about .5 part to about 20 parts polygalactomannan gum.
11. The method of claim 1 wherein the pH of the cellulose suspension is adjusted after adding said borate and polygalactomannan gum.
12. The method of claim 11 wherein said gum is selected from the group consisting of guar gum and locust bean gum and cationic guar gum and cationic locust bean gum, and said borate is selected from the group consisting of meta-boric acid and ortho-boric acid and sodium meta-borate and sodium tetraborate and potassium meta-borate and potassium tetraborate.

References Cited
UNITED STATES PATENTS

| | | | |
|---|---|---|---|
| 2,644,749 | 7/1953 | Frisch et al. | 162—178 |
| 2,685,508 | 8/1954 | Spear | 162—178X |
| 3,303,184 | 2/1967 | Nordgren | 162—178 |
| 3,392,085 | 7/1968 | Oliver | 162—178X |

OTHER REFERENCES

Keen, J. L., et al.: Colorimetric Method, etc., Tappi, vol. 40, No. 2, February 1957, pp. 100–104 (P.O.S.L.).

Swanson, J. W.: The Science of Chemical Additives in Papermaking, Tappi, vol. 44, No. 1, Janauary 1961, pp. 142-A through 147A, 149A through 152A, 155A through 157A, 178A and 179A relied on (P.O.S.L.).

MICHAEL ROGERS, Primary Examiner

U.S. Cl. X.R.
162—190; 252—181